G. W. KUENNETH.
LET-OFF MECHANISM FOR NARROW WARE LOOMS.
APPLICATION FILED MAY 22, 1908.
968,367.
Patented Aug. 23, 1910.
6 SHEETS—SHEET 1.
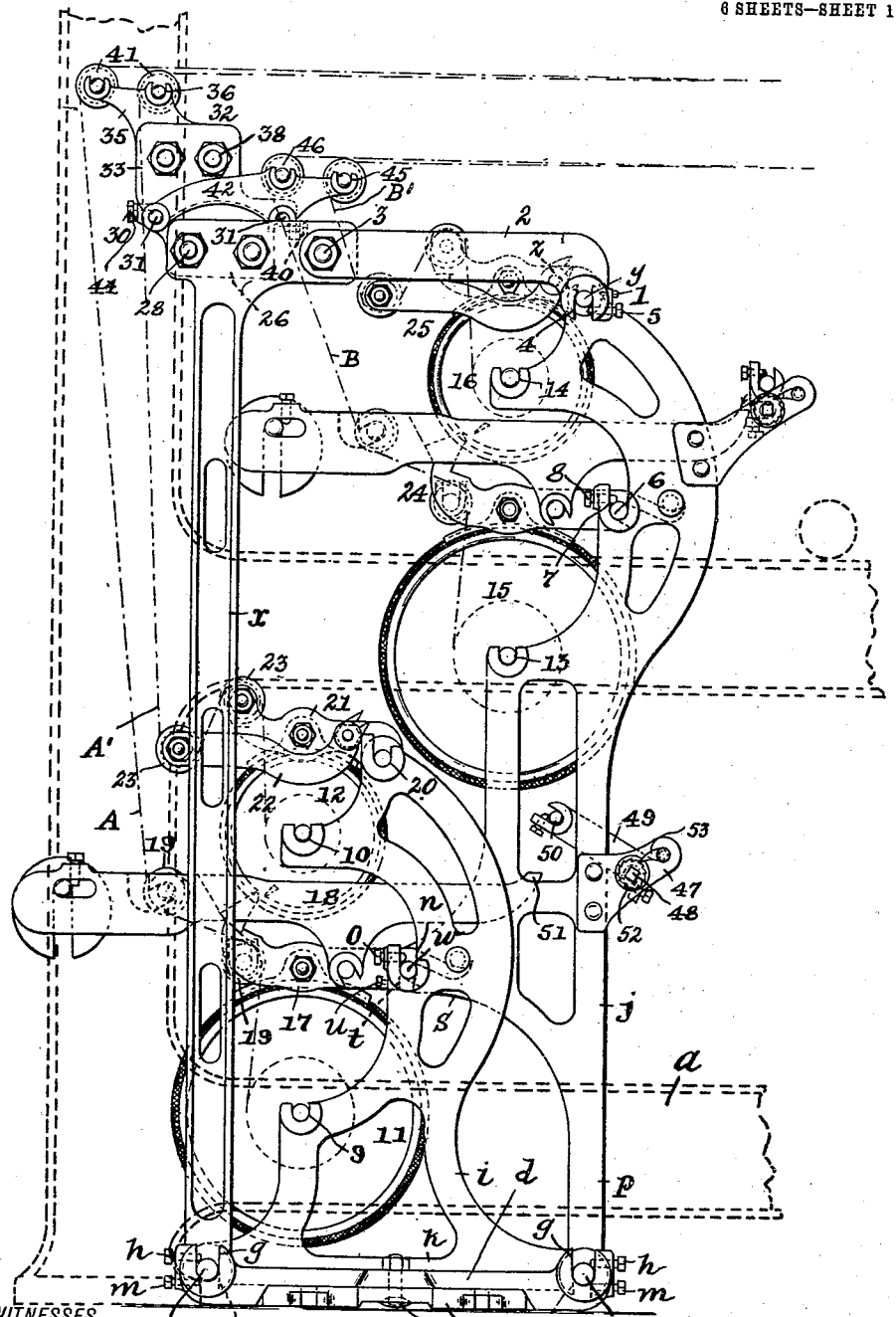
WITNESSES
INVENTOR,
George W. Kuenneth,
BY
ATTORNEY.

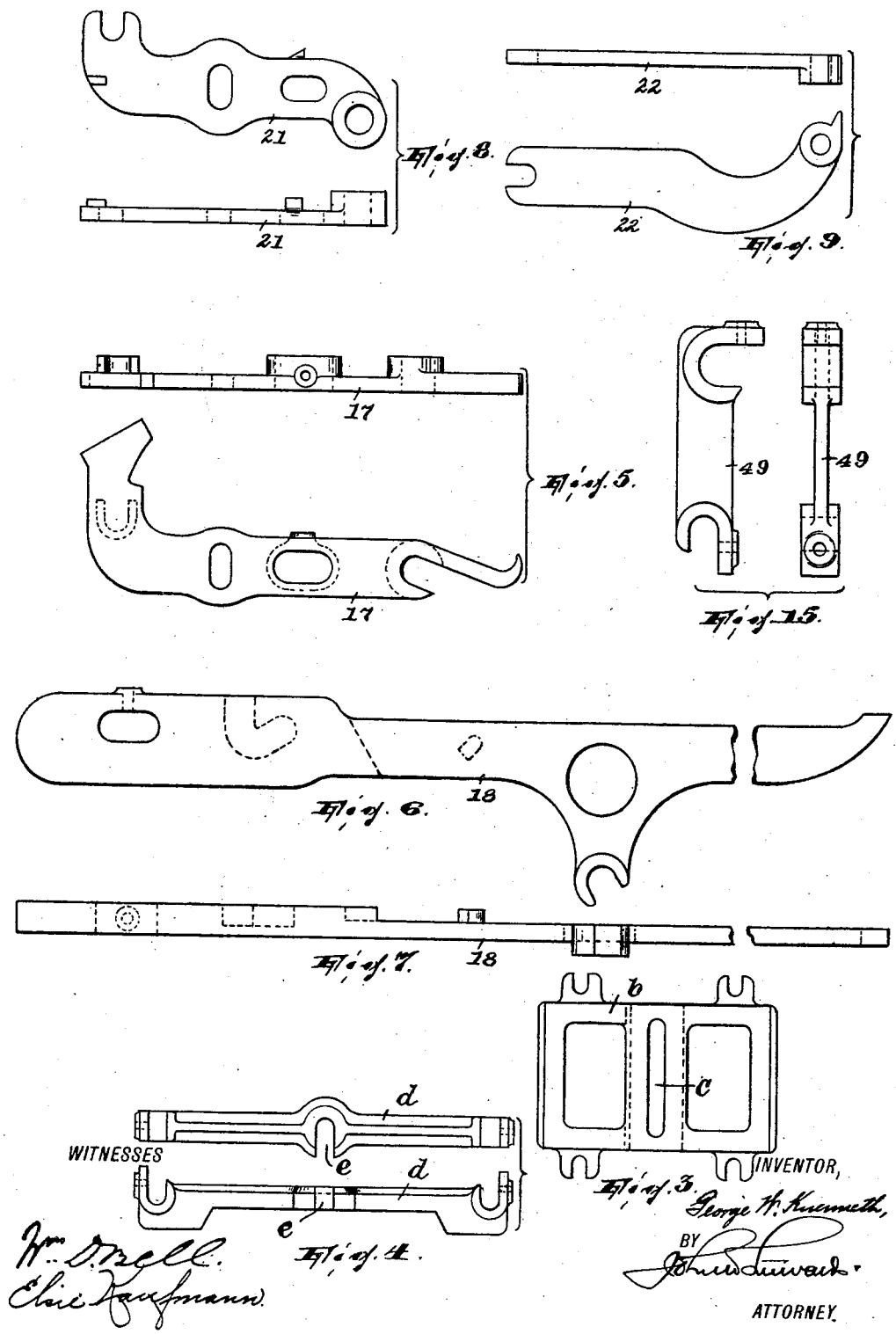

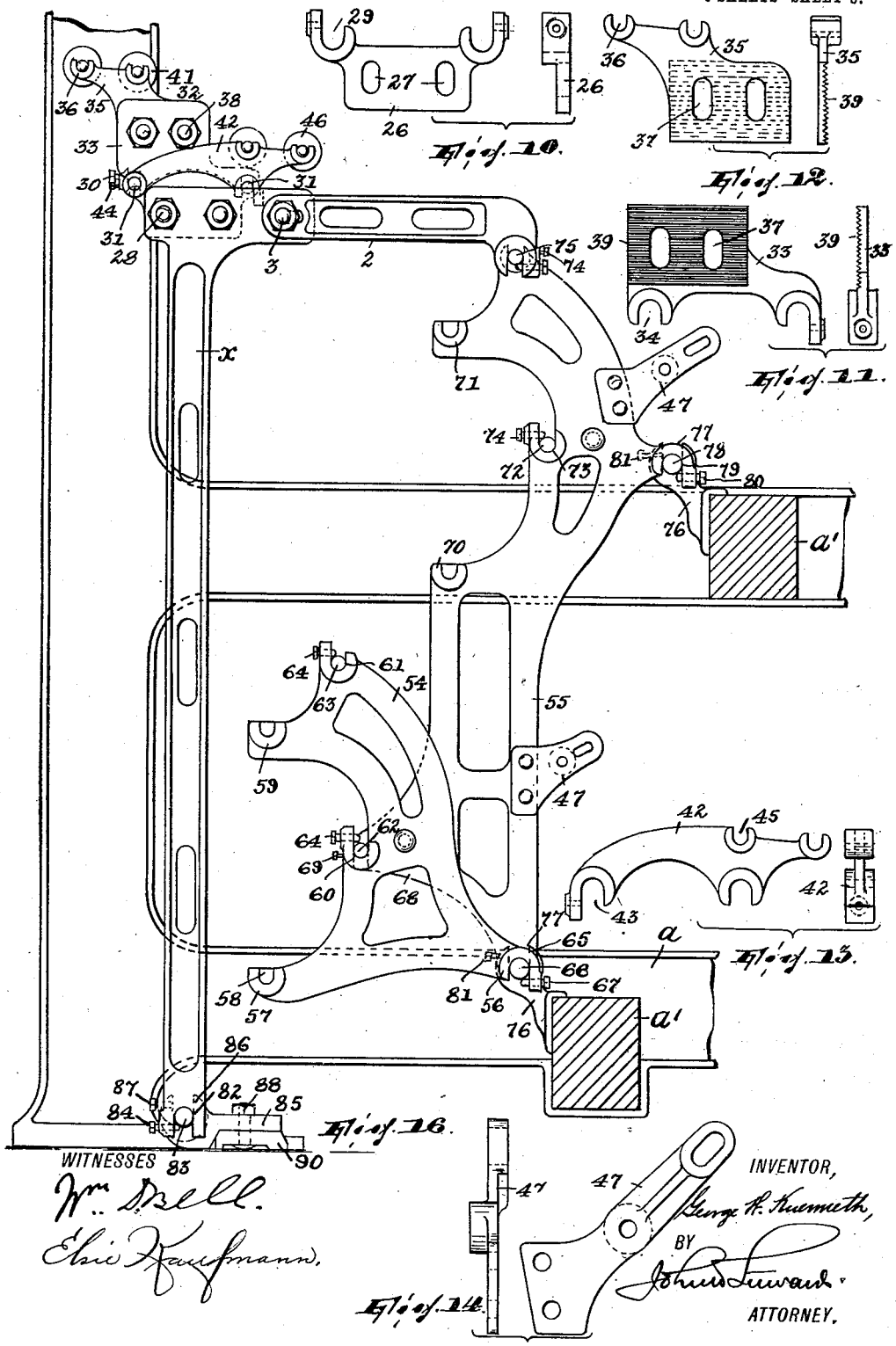

G. W. KUENNETH.
LET-OFF MECHANISM FOR NARROW WARE LOOMS.
APPLICATION FILED MAY 22, 1908.
968,367.
Patented Aug. 23, 1910.
6 SHEETS—SHEET 4.
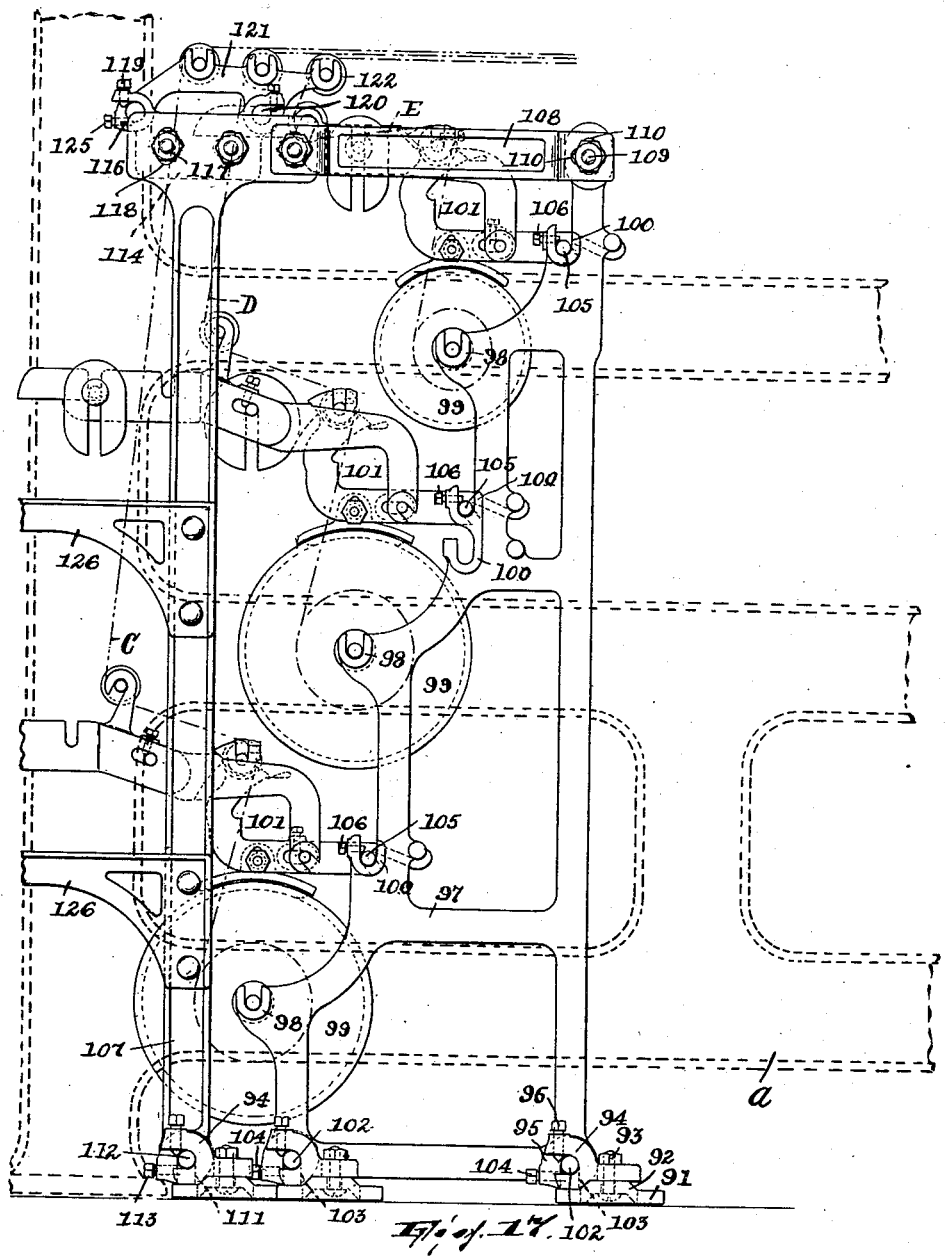
WITNESSES
INVENTOR,
George H. Kuenneth,
BY
ATTORNEY.

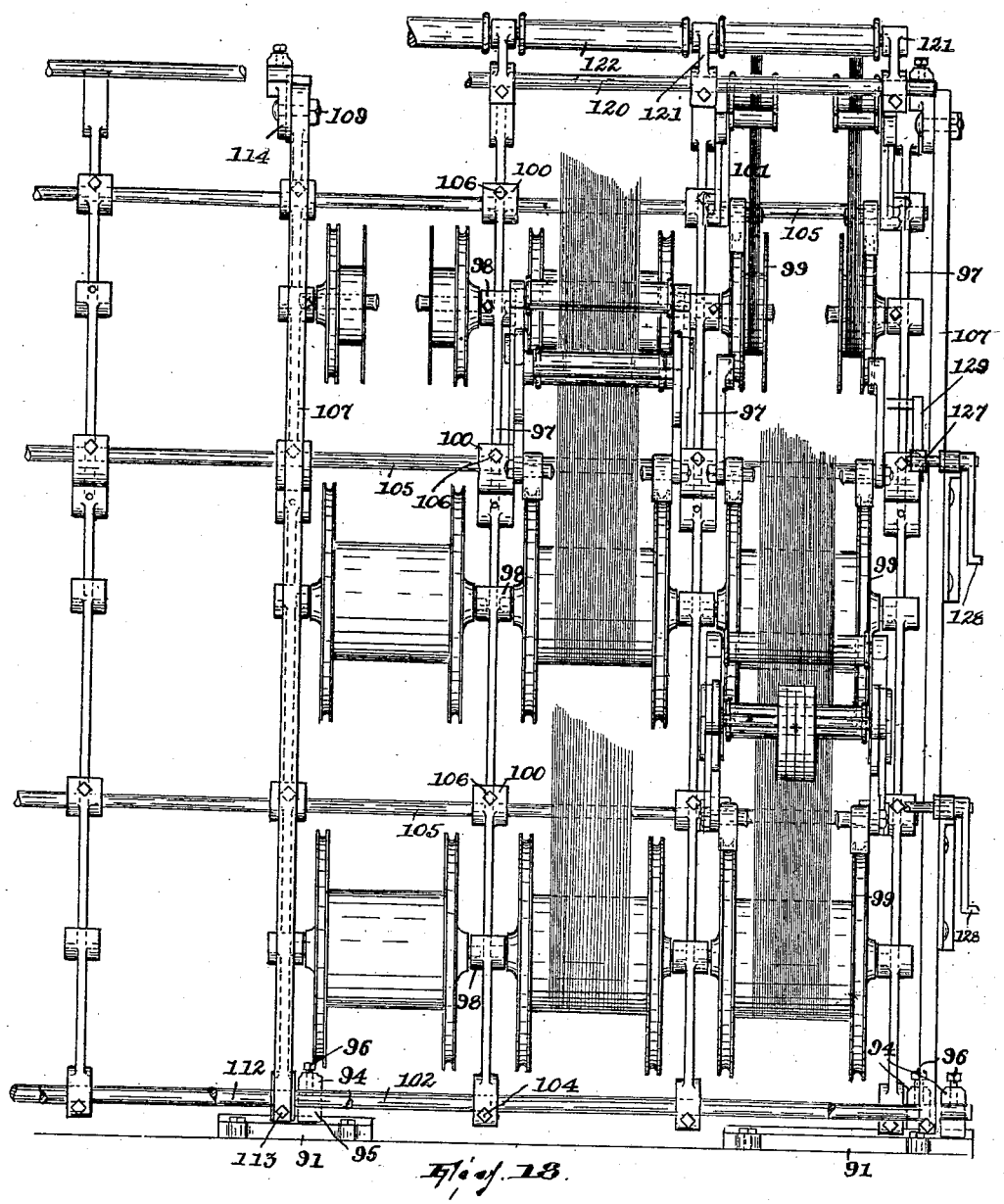

G. W. KUENNETH.
LET-OFF MECHANISM FOR NARROW WARE LOOMS.
APPLICATION FILED MAY 22, 1908.
968,367.
Patented Aug. 23, 1910.
6 SHEETS—SHEET 6.
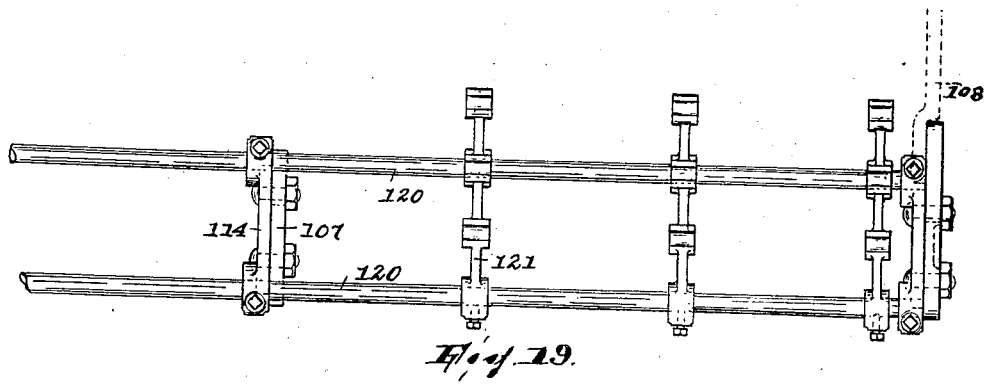
Fig. 19.
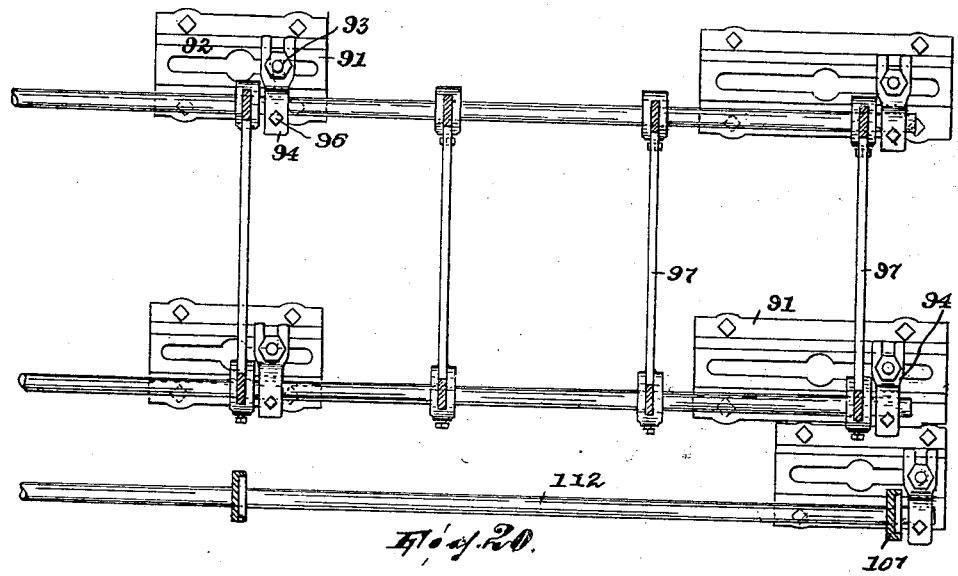
Fig. 20.
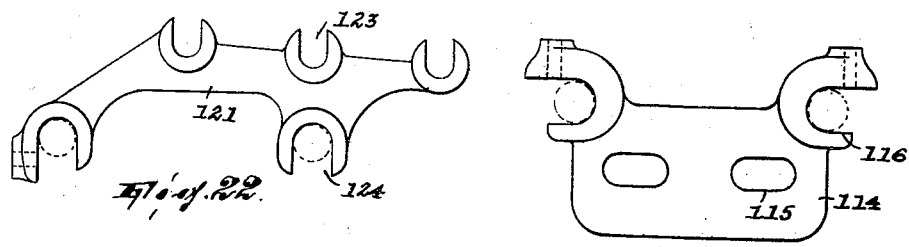
Fig. 22.
Fig. 21.
WITNESSES
Fig. 23.
INVENTOR,
George W. Kuenneth,
BY
ATTORNEY.

UNITED STATES PATENT OFFICE.

GEORGE W. KUENNETH, OF PATERSON, NEW JERSEY.

LET-OFF MECHANISM FOR NARROW-WARE LOOMS.

968,367. Specification of Letters Patent. Patented Aug. 23, 1910.

Application filed May 22, 1908. Serial No. 434,353.

*To all whom it may concern:*

Be it known that I, GEORGE W. KUENNETH, a citizen of the United States, residing in Paterson, Passaic county, New Jersey, have invented a certain new and useful Improvement in Let-Off Mechanisms for Narrow-Ware Looms; and I do hereby declare the following to a full, clear, and exact description of the invention, such as will enable others skilled in the art to which it appertains to make and use the same, reference being had to the accompanying drawings and to letters of reference marked thereon, which form a part of this specification.

This invention relates to let-off mechanisms for narrow-ware looms, and it has for its principal objects (1) to provide a supporting structure for the warp-rolls, tension mechanisms and warp-guiding means which shall not only be adapted to be employed with many different styles of looms and, owing to great range of adjustability, in connection with looms of varying dimensions, but which may be quickly set up and readily made an active part of the loom organism; (2) so to construct said structure that it may be conveniently adapted to be removed from the loom, as when it is desired to begin to weave goods of different width from that previously woven, and substituted by another similar structure adapted to the new width of weave; and (3) to provide means whereby, as when the loom is not in service, the tension may be by a single operation removed from all the warps, thus preventing the undue stretching thereof.

My invention will be found fully illustrated in the accompanying drawings, wherein, Figure 1 is a view in side elevation of one form of my improved let-off mechanism for narrow-ware looms; Fig. 2 illustrates a detail; Fig. 3 shows a floor-plate adapted to be used with the mechanism as shown in Fig. 1; Fig. 4 shows in plan and side elevation a bracket adapted to be carried by said floor-plate; Fig. 5 shows in plan and side elevation a brake-lever for said mechanism; Figs. 6 and 7 are side and plan views of a tension-lever for said mechanism; Fig. 8 shows in side elevation and plan a brake-lever for the edge-warp; Fig. 9 shows in plan and side elevation a tension-lever for the edge-warp; Fig. 10 shows one of the brackets which carry rods on which the warp guide roller brackets are arranged; Figs. 11 and 12 show in rear and side elevation complementary members of one form of the warp guide roller brackets; Fig. 13 shows in side and rear elevation the other form of guide roller brackets; Fig. 14 shows in side and rear elevation a bracket for supporting the means for releasing the tension on the warps; Fig. 15 illustrates in side and front elevation a crank comprised in said means; Fig. 16 is a view in side elevation of another form of my improved let-off mechanism with the warp rolls and tension mechanisms removed; Fig. 17 shows still another form of my invention in side elevation; Fig. 18 is a view in rear elevation of what is shown in Fig. 17; Fig. 19 is a plan of the warp guide rollers supporting means shown in Figs. 17 and 18; Fig. 20 is a horizontal sectional view taken in a horizontal plan below the axes of the lower warp rolls in Fig. 17; Figs. 21 and 22 show brackets forming parts of the warp guide rollers supporting means in Figs. 17, 28 and 19; and, Fig. 23 shows one of the brackets illustrated in Figs. 17, 18 and 20.

Referring, first, to Figs. 1 to 15, $a$ designates the back portion of a loom frame. Between the sides of the frame I bolt to the floor two or more floor plates $b$ (see Fig. 3) each having the transverse slot $c$. On each floor plate rests a bracket $d$ which is recessed on the under side to fit the floor plate and so that it will rest at its ends on the floor; this bracket has the centrally located recess $e$ adapted to receive a bolt $f$ which extends through slot $c$ and clamps the bracket to the floor plates. The bracket has at each end an upwardly opening recess $g$ and a set screw $h$.

$i$ designates stands for the lower set of warp rolls and tension mechanisms and $j$ stands for the upper set of warp rolls and tension mechanisms; the stands $i$ and $j$ are arranged in pairs alternating with each other. Each stand $i$ has a base portion $k$ formed at the front and rear with a downwardly opening recess $l$ and carrying at these points set screws $m$; it also has, in an elevated part thereof, an upwardly opening recess $n$ and a set screw $o$. Each stand $j$ has a foot (Fig. 2) formed with a downwardly opening recess $q$ and having a set screw $r$; it also has a forwardly extending portion $s$ formed with a downwardly opening recess $t$ and having a set screw $u$. Parallel rods $v$ are introduced into the recesses *l* of the stands *i* and the recesses *q* of the stands *j* and are held therein by the set screws *m* and *r*. *w* is a rod which is introduced into the recesses *n* and *t* and is held therein by the set screws *o* and *u*. The rods *v* and *w*, which extend substantially from one side to the other of the loom frame, thus connect the pairs of stands *i* and *j*, as many as may be required, together, so that a unitary structure is produced. This structure preferably comprises a bracing means for the upper parts of the stands *j* and this bracing means includes the uprights *x* (there being preferably the same number of uprights as there are floor plates *b*), a rod *y* which is secured in upwardly opening recesses *z* in the stands *j* by set screws 1 and the links 2 which are bolted at 3 to the uprights and have downwardly opening recesses 4 receiving the rod *y*, each link being secured to the rod by the set screw 5. Said structure may also comprise a rod 6 set in upwardly opening recesses 7 in the stands *j* and secured therein by the set screws 8. Said structure, comprising the stands *i* and *j*, the bracing means and the rods *v*, *w* and 6, is adapted to be placed bodily in supported relation in the recesses *g* of the brackets *d*, the rods *v* resting in said recesses and being held therein by the set screws *h*. The purpose of this arrangement is to permit one such structure, carrying warp rolls and tension mechanisms adapted for the weaving of one width of goods, to be removed bodily from the brackets *d* and another, carrying warp rolls and tension mechanisms adapted for weaving a different width of goods, to be substituted.

In the open bearings 9 and 10 of each pair of stands *i* are journaled the body warp rolls and edge warp rolls 11 and 12, respectively; in the open bearings 13 and 14 of the stands *j* are journaled the body warp rolls and edge warp rolls 15 and 16, respectively. On the rod *w* there are fulcrumed the lever structures forming the tension mechanisms for the warp rolls 11, the same comprising the brake levers 17 directly fulcrumed on said rod and the tension levers 18 fulcrumed on the brake levers 17, the brake levers 17 and tension levers 18 carrying the rollers 19 around which the body warp A corresponding to the stand *i* extends; in open bearings 20 are journaled the lever structures forming the tension mechanisms for the warp rolls 12, the same comprising the brake levers 21 directly fulcrumed in said bearings 20 and the tension levers 22, fulcrumed in said brake levers, and the levers 21 and 22 carrying the rollers 23 around which the edge warp A' extends.

On the shaft 6 are fulcrumed lever structures 24 for the warp rollers 15, and on the rod *y* are fulcrumed lever structures 25 for the warp rolls 16; these lever structures are the tension mechanisms for the body and edge warps B and B', respectively, and, the parts thereof being substantially identical to the corresponding parts of the lever structures forming the tension mechanisms for the warps A and A', a detailed description thereof is unnecessary.

Bolted to one face of each upright *x* is a bracket 26 having slots 27 to receive the bolts 28 and allow the vertical adjustment of said bracket. In upwardly opening bearings 29 of the brackets 26 are removably secured by the set screws 30 the parallel rods 31. On these rods are arranged, in such relation as to coincide with the stands *i*, the two-part brackets 32; each bracket 32 comprises the bracket member 33 having downwardly opening recesses 34 and the bracket member 35 having upwardly opening recesses 36, said bracket members having vertical slots 37 to receive the securing bolts 38 and having their adjoining faces serrated, as at 39, so as to interlock with each other when the members are clamped together. Each bracket 32 is placed on the rods 31, which are received by the recesses 34, being there held by the set screws 40, the warp guide rollers 41 for the warps A and A' being journaled in the bearings 36 of said brackets. On the rods 31, in such relation as to coincide with the stands *j*, are arranged the brackets 42 having downwardly opening recesses 43 receiving said rods and the set screws 44 securing the brackets to the rods and also having bearings 45 for the warp guide rollers 46 for the warps B and B'. The arrangement and construction of the brackets for supporting the warp guide rollers 41 and 46 are such that the guide rollers may be adjusted to such elevations as may be necessary in any loom to which my mechanism is applied.

Brackets 47 are secured to the series of stands *j*, and in these are journaled shafts 48 carrying the removable cranks 49 in which is arranged the removable rod 50; the end of shaft 48 is squared to receive a crank or handle for turning the shaft and thus bringing the rod 50 against the rearwardly extending end 51 of the tension levers of the lever structures forming the tension mechanisms for the body warps and depressing said tension levers so that the tension on the body warps is relieved. In order to hold the parts in this position, a ratchet 52 is secured on the shaft and is engaged by the pawl 53. Thus the weaver, by a simple operation, can relieve the tension on all the body warp in the loom at once, as when it is desired, the loom not being in operation, to prevent undue stretching of the warps.

The construction shown in Fig. 16 is substantially the same in all details as that just described excepting that the two sets of stands are carried directly by the loom instead of having support on the floor; it will therefore only be necessary to describe the construction of these stands and the manner of mounting them.

54 designates pairs of stands for the lower body and edge warp rolls and their tension mechanisms and 55 the pairs of stands for the upper warp rolls and their tension mechanisms. The stands 54 have the rearwardly extending downwardly recessed feet 56 and the forwardly extending feet 57 having the open bearing 58 adapted to receive the body warp rolls (not shown); they also have the open bearings 59 for the edge warp rolls (not shown). At 60 and 61 they are provided with upwardly opening recesses to receive the rods 62 and 63, secured therein by set screws 64, for securing the several pairs of stands together and serving as the fulcrum for the lever structures of the tension mechanisms for the warp rolls. The stands 55 have the downwardly recessed feet 65 receiving the rod 66, which is also received by the recessed feet 56 of the stands 54, which connects all said stands together and is secured therein by the set screws 67; each stand 55 has a rearwardly projecting downwardly recessed portion 68 which receives the rod 62 and is secured thereto by the set screws 69. The open bearings for the lower and upper body warp rolls of the stands 55 are designated at 70 and 71. At 72 is secured in open bearings 73 of the stands 55, by means of the set screws 74, a rod connecting the stands 55, and at 75 is similarly arranged another rod connecting said stands, the rod 72 forming a fulcrum for the lever structures forming the tension mechanisms for the upper body warp rolls and the rod 75 affording a fulcrum for the lever structures forming the tension mechanisms for the upper edge warp rolls and also a means to which to attach the links 2 of the bracing means (already described in reference to Fig. 1).

The structure comprising the stands 54 and 55, the rods 62, 66, 72 and 75, is adapted to be supported on the cross beams $a'$ of the loom frame by the brackets 76 which have upwardly opening recesses 77, the rod 66 and another rod 78 (arranged in the downwardly opening recesses 79 of the rear upper portions of the stands 55 and held therein by the set screws 80) directly resting in said recesses 77 and being held therein by the set screws 81. The uprights $x$ of the bracing means in this instance has its lower end recessed, as at 82, and receiving a rod 83 which connects the several uprights and is secured therein by the set screws 84. Brackets 85, which are recessed at 86, receive this rod, which is held in the recesses 86 by the set screws 87, each bracket being secured by the bolt 88 to the floor plate 90.

Referring to Figs. 17 to 23, in this instance the structure comprising the stands, its bracing means, the warp guide rollers and the warp rolls and their tension mechanisms is removable from the brackets carried by the floor plates horizontally instead of upwardly. 91 designates the floor plates each having the longitudinal raised slotted portion 92 to receive the bolt 93 which secures in place a bracket 94 having a forwardly opening recess 95 and the set screw 96. There are three parallel series of these floor plates and brackets (Figs. 17 and 20). 97 designates the stands for the warp rolls and tension mechanisms, the same being provided at the superposed points 98 with bearings for the warp rolls 99 and at the points 100 with recesses for the fulcrumed tension mechanisms 101 corresponding to said warp rolls. These stands are connected together by the parallel rods 102 which are secured in their downwardly open feet 103 by the set screws 104; 105 denotes other rods which may form the fulcrums for the tension mechanisms and which also connect the stands together, being secured in the recesses 100 by set screws 106. The bracing means comprises the uprights 107 which are connected with the upper ends of certain of the stands, by the links 108, the bolts 109, which bind the links, uprights and stands together, being extended through vertically and horizontally crossing slots 110 so as to permit adjustment. The downwardly opening foot 111 of each upright receives the connecting rod 112 which is held therein by the set screws 113. 114 designates brackets having horizontal slots 115 and outwardly opening recesses 116. These brackets are secured to the uprights by the bolts 117 which penetrate the slots 115 and vertical slots 118 in the uprights. In the recesses 116 are secured, by the set screws 119, the parallel rods 120 and on these rods are arranged the brackets 121 for the warp guide rollers 122 which are arranged in upwardly opening recesses 123 in the brackets. The brackets have downwardly opening recesses 124 which receive the rods 120 and to which they may be secured by the set screws 125. The construction as shown is adapted for a single decker loom employing a body warp C, a special or binder warp D and an edge warp E, though it will be understood that the binder warp mechanism may be omitted. The uprights 107 carry the brackets 126 in which is journaled a shaft 127 having a handle 128 and carrying as many cranks 129 as there are tension levers for the tension mechanisms, said cranks being arranged under and adapted to engage the tension levers when the shaft is turned in its bearings for the purpose of raising the tension levers and thus releasing the tension on the warps. The structure comprises the stands 97, the bracing means, the warp rolls and their tension mechanisms, the warp guiding means and the rods 102, 105, and 112 is adapted to be placed bodily in or removed bodily from the brackets 94; when arranged in the brackets it is secured therein by the set screws 96.

Having thus fully described my invention what I claim as new and desire to secure by Letters Patent is:

1. The combination of a unitary supporting structure comprising a plurality of parallel stands and connecting means rigidly joining said stands together comprising a rod, and sustaining means for said structure comprising recessed bracket-members removably receiving and supporting said rod, substantially as described.

2. The combination of a unitary supporting structure comprising a plurality of parallel stands and rods rigidly joining said stands together, a warp-roll and a tension mechanism carried by said structure, and sustaining means for said structure comprising recessed bracket-members removably receiving and supporting one of said rods, substantially as described.

3. The combination of a unitary supporting structure comprising a plurality of parallel stands and rods rigidly joining said stands together, a warp-roll and a tension mechanism carried by said structure, sustaining means for said structure comprising recessed bracket-members removably receiving and supporting one of said rods, and floor plates carrying said bracket-members, said floor plates and bracket-members having slot-and-bolt connections between them, substantially as described.

4. The combination of a supporting structure comprising a plurality of parallel stands, means for rigidly connecting said stands together, and brackets having upwardly open recesses arranged the one relatively forward of the other and in approximately the same horizontal plane and removably receiving portions of said structure, substantially as described.

5. The combination of a supporting structure comprising a plurality of parallel stands, a plurality of rods rigidly connecting said stands together and occupying substantially the same horizontal plane, and brackets having upwardly open recesses arranged the one relatively forward of the other and removably receiving said rods, substantially as described.

6. The combination of a supporting structure, comprising a plurality of stands and a rod rigidly joining said stands together, the warp-rolls, tension mechanisms, brackets having open recesses, floor-plates, said brackets being adjustably arranged on the floor-plates, and bracing means for said structure comprising another rod parallel with the first-named rod, said rods being arranged in the recesses of said brackets, substantially as described.

7. The combination of the loom-frame, a supporting structure, said structure comprising connecting rods, the warp-rolls and tension mechanisms arranged in said structure, means, removably receiving said rods, for sustaining said structure on the loom-frame, and a bracing means for said structure distinct from the loom frame engaging one of said rods, substantially as described.

8. The combination of the loom-frame, a supporting structure, the warp-rolls and tension mechanisms arranged in said structure, means for removably sustaining said structure on the loom-frame, and a bracing means for said structure distinct from the loom frame, substantially as described.

9. The combination of a frame, upper and lower sustaining means arranged in the frame, a pair of stands carried by both the upper and the lower sustaining means, another pair of stands carried by the lower sustaining means and standing clear of the upper sustaining means, and means for rigidly connecting said pairs of stands together, substantially as described.

10. The combination of a supporting structure, a warp-roll, a tension mechanism comprising a lever-structure, and means for moving the lever-structure on its fulcrum and thereupon holding it out of its normal position, whereby to relieve the tension on the warp, substantially as described.

11. The combination of a supporting structure, a plurality of warp-rolls, tension mechanism comprising lever-structures, and means for simultaneously moving the lever-structures on their fulcrums and thereupon holding them out of their normal positions, whereby to relieve the tension on the warp, substantially as described.

12. The combination of a supporting structure, a warp-roll, a tension mechanism comprising a lever-structure, and means for moving the lever-structure and thereupon holding it out of its normal position, whereby to relieve the tension on the warp, substantially as described.

In testimony, that I claim the foregoing, I have hereunto set my hand this 20th day of May, 1908.

GEO. W. KUENNETH.

Witnesses:
  WM. D. BELL,
  JOHN W. STEWARD.